May 19, 1964 B. D. BEAMISH ETAL 3,133,732
APPARATUS FOR FOLDING SHEETS
Filed April 12, 1962 5 Sheets-Sheet 1
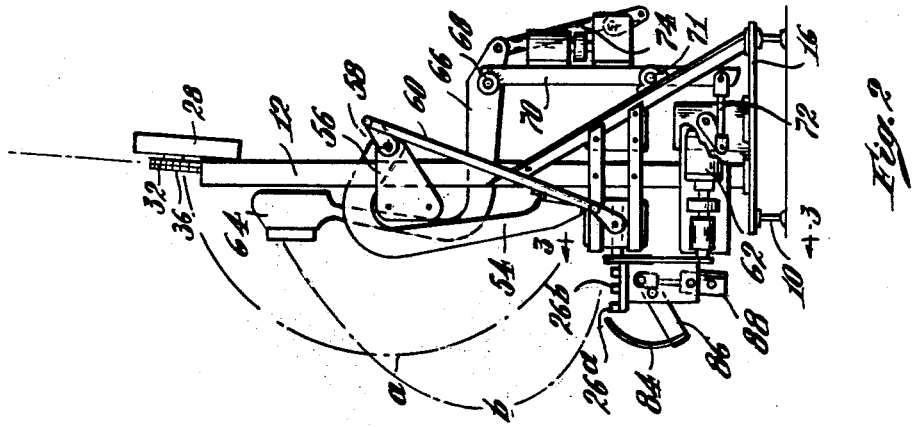
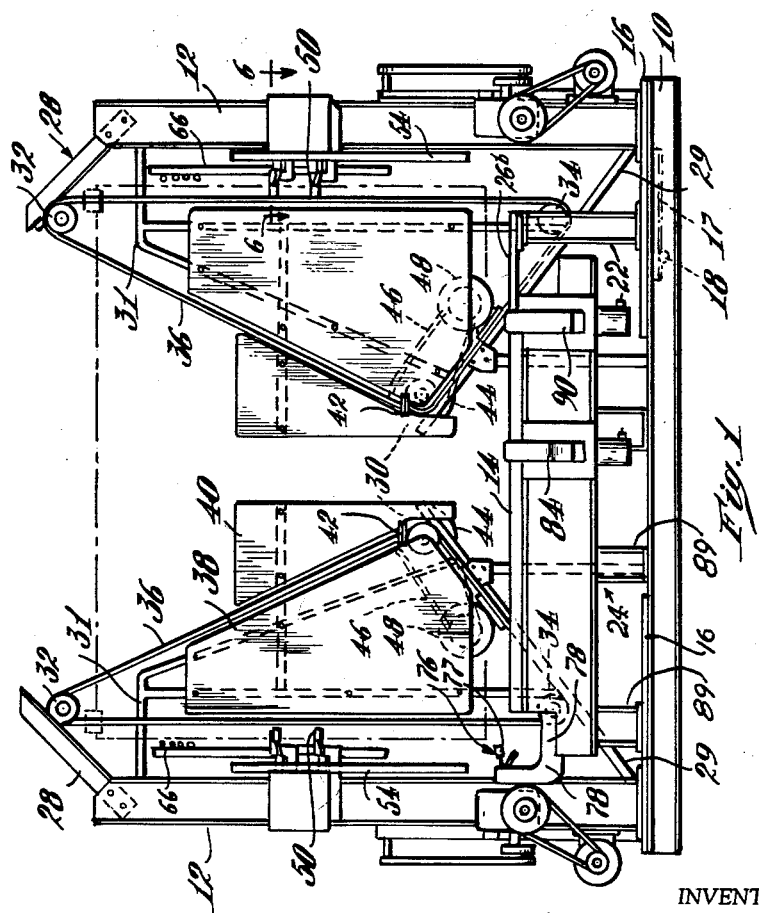
INVENTOR.
Bernard Delacour Beamish
William B. Weis
by Roberts, Cushman & Grover
ATT'YS

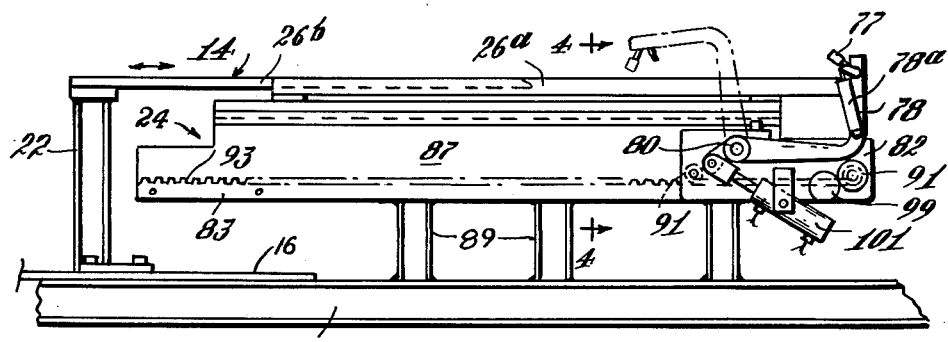
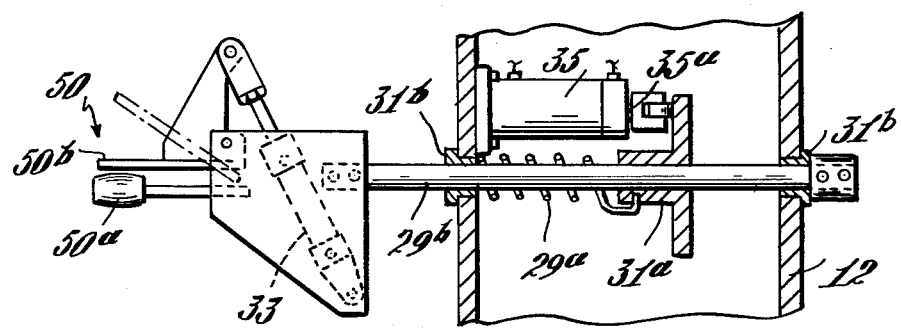
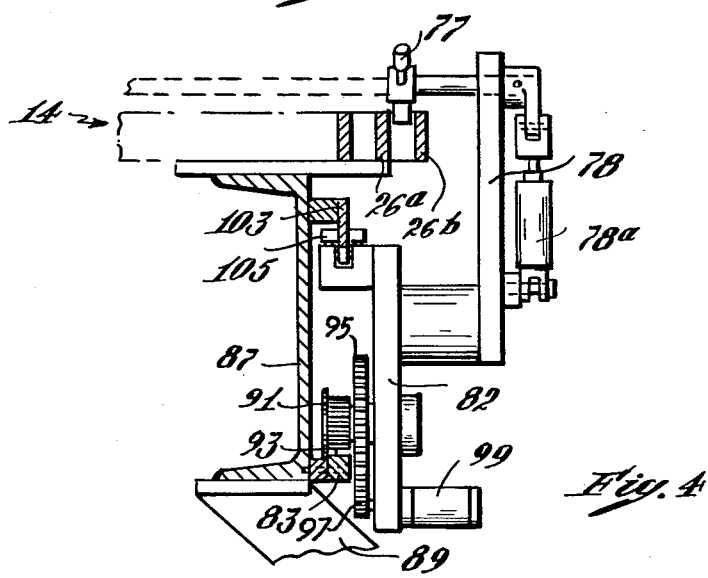

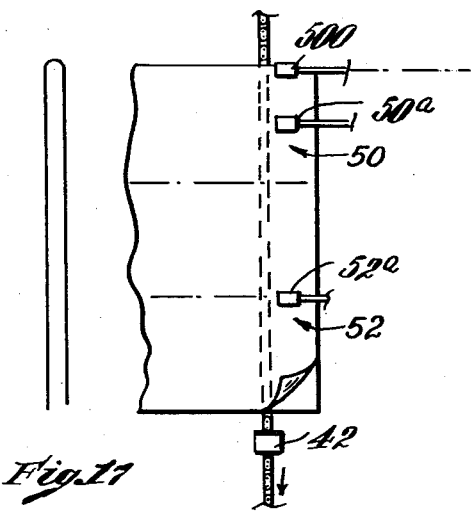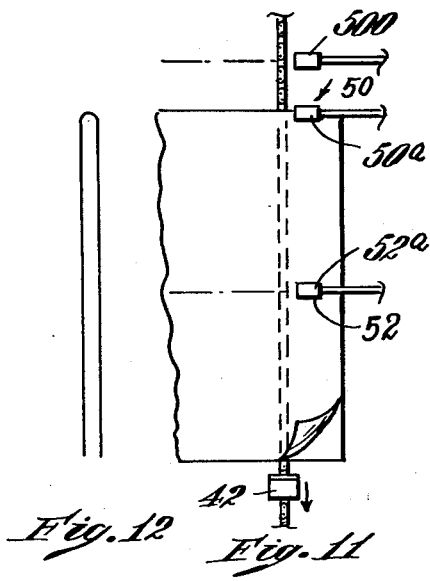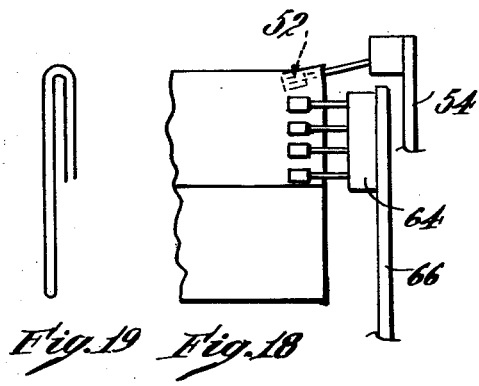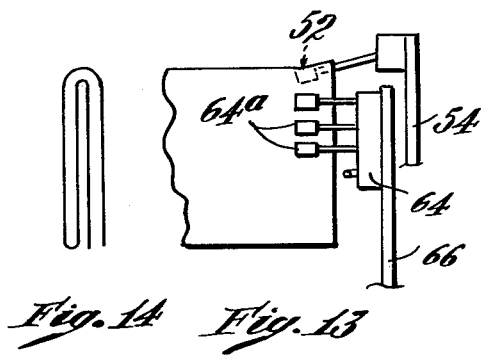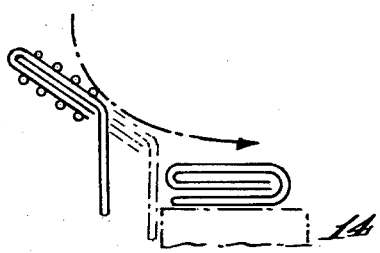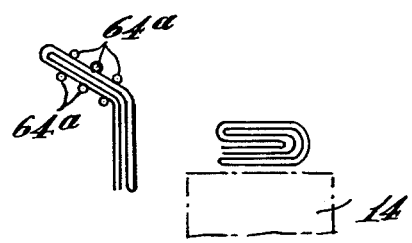

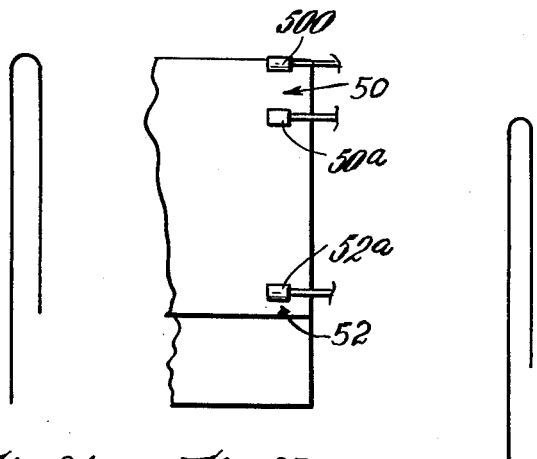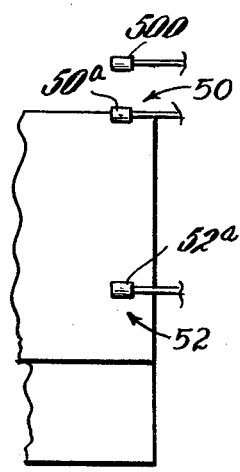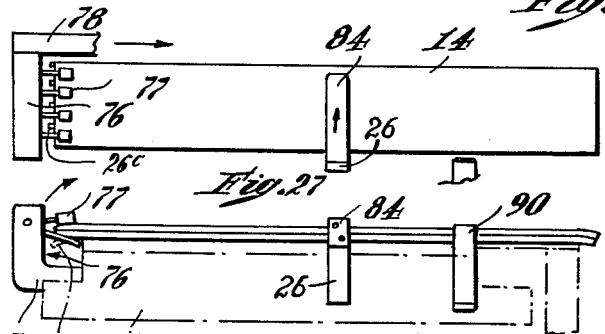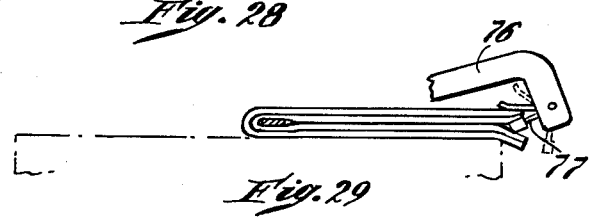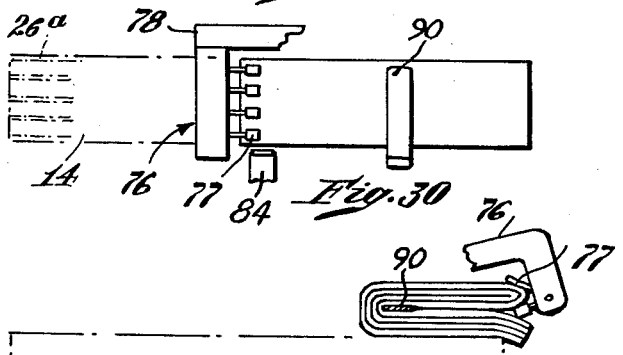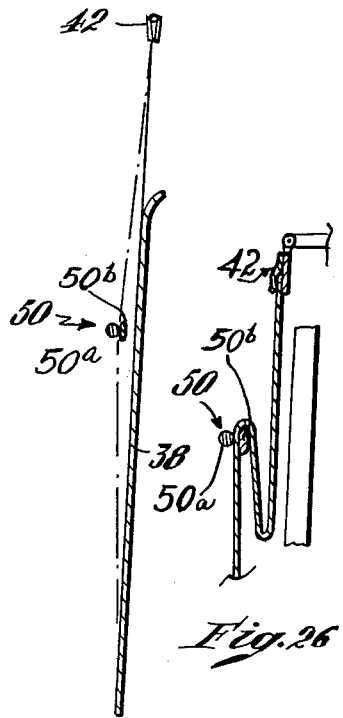

United States Patent Office 3,133,732
Patented May 19, 1964

3,133,732
APPARATUS FOR FOLDING SHEETS
Bernard Delacour Beamish, New Rochelle, N.Y. (% Pepperell Manufacturing Company, 160 State St., Boston, Mass.), and William B. Weis, Hartsdale, N.Y.; said Weis assignor to said Beamish
Filed Apr. 12, 1962, Ser. No. 186,887
43 Claims. (Cl. 270—61)

This invention relates to folding sheets for packaging and has for its principal objects to provide a machine for folding sheets both widthwise and lengthwise, rapidly and precisely to form substantially flat rectangular packages of uniform dimensions and appearance; to provide a machine for folding sheets of different widths to make packages of the same width and length; to provide a machine for folding sheets of different width either six or eight times widthwise; to provide a machine which is adjustable to receive sheets of different length for folding endwise; and to provide a machine which will permit inspection of the sheets prior to folding so that defective sheets may be discarded, or disposed of as "seconds," which is efficient in operation, dependable, and is substantially automatic and hence does not require highly skilled operators.

As herein illustrated, the machine comprises a folding table, first folding means supported in spaced relation above the table, and clamping means movable upwardly to lift a sheet by two of its corners at one side edge and hold it in suspension in an upright plane which passes through a line extending between the first folding means, with its upper side edge at a predetermined distance above the first folding means. The first folding means is operable to grip the end edges of the sheet intermediate its side edges, whereupon the clamping means are movable downwardly to fold the portion of the sheet situated above the first folding means downwardly behind the portion of the sheet situated below the first folding means and to release the corners of the sheet. Second folding means are supported in spaced relation below the first folding means operable to grip the end edges of the folded sheet intermediate the first fold and the subjacent side edges and then to move the folded sheet forwardly and upwardly relative to the first folding means to an elevated position above the first folding means, the latter being operable to release the sheet as the second folding means moves upwardly thereby to fold the sheet again. The second folding means is operable at said elevated position to release the sheet to transfer means adapted to grip the upper half of the twice folded sheet and to move it forwardly and downwardly to a position forwardly of the table and substantially parallel to the top thereof, so that the upper half of the sheet is parallel to the table top and the lower half hangs from the rear edge of the upper half below the top of the table at the front side and then move it rearwardly, parallel to the top of the table to fold the lower half beneath the upper half to form an elongate plait. The plait is now folded endwise by a transfer means movable lengthwise of the table relative to a first and optionally a second folding bar. When two folding bars are employed, they are alternately movable into engagement with the plait resting on the table, the first folding bar being located at a predetermined distance from the right end of the table and the second midway between the first and the right end of the table. The second transfer means has jaws adapted to engage the end of the plait at the left end of the table and carry the portion of the plait at the left side of the first folding bar over the first folding bar into engagement with the portion of the plait at the right side of the first folding bar thereby to fold the plait once, release the end and return to a position adjacent the fold. If the second folding bar is omitted the plait folded once can now be folded again by hand. If the second folding means is employed when the first folding bar is retracted the second folding bar is moved into operative position whereupon the transfer means is again moved longitudinally of the table into engagement with the folded edge of the plait to carry the folded end of the plait across the second folding bar to fold the plait again, release the folded end and return to its initial position at the left end of the table. The second folding bar is now retracted, leaving the finished package resting on the table.

The invention will now be described in greater detail with reference to the accompanying drawings wherein:

FIG. 1 is a front elevation of the machine;
FIG. 2 is a side elevation;
FIG. 3 is an elevation of the folding table at the base of the apparatus as seen from the rear side showing the second transfer means at rest and part way along the table;
FIG. 4 is a vertical section taken on the line 4—4 of FIG. 3;
FIG. 5 is an elevation partly in section of one of the two clamping means, by means of which the corners of the sheet are pulled upwardly to support the sheet in suspension preparatory to folding:
FIG. 6 is a plan view of one of the two first folding means;
FIG. 7 is a plan view of one of the second folding means;
FIG. 8 is a side elevation of the folding means shown in FIG. 7;
FIG. 9 is a front elevation of the folding means shown in FIG. 7;
FIG. 10 is a plan view of one of the two first transfer means;
FIG. 11 is an elevation of an 81 inch sheet folded once, showing the relative location of the first and second folding means for making eight folds;
FIG. 12 is an end elevation of FIG. 11;
FIG. 13 is a fragmentary elevation showing the sheet doubled a second time and the relation of the second folding means and the first transfer means to each other;
FIG. 14 is an end view of FIG. 13;
FIG. 15 diagrammatically illustrates the position of the first transfer means and the doubly folded sheet just before it reaches the top of the folding table for final folding thereon;
FIGS. 16 to 20 inclusive, show the same sequence of folding operation on an 81 inch sheet for making six folds;
FIGS. 21 and 22 show the position of a 72 inch sheet relative to the first and second folding means for making eight folds;
FIGS. 23 and 24 show a 72 inch sheet relative to the first and second folding means for making six folds;
FIG. 25 shows the relative inclined position of the sheet support, the first folding means and the supporting clamps;
FIG. 26 is a fragmentary elevation showing the movement of that portion of a sheet above the first folding means downwardly behind it for first folding;
FIG. 27 is a plan view of the folding table;
FIG. 28 is an elevation of the folding table as seen from the front side with an elongate plait thereon resting full length;
FIG. 28a is a fragmentary elevation at the left-hand end of the table showing leaf spring fingers supporting the plait in a position for engagement of the transfer means therewith;

FIG. 29 is a fragmentary elevation showing the plait folded once;

FIG. 30 is a plan view of the table showing the second folding means situated intermediate the ends preparatory to the second folding operation;

FIG. 31 is a fragmentary elevation showing the plait folded a second time; and

Figure 7:
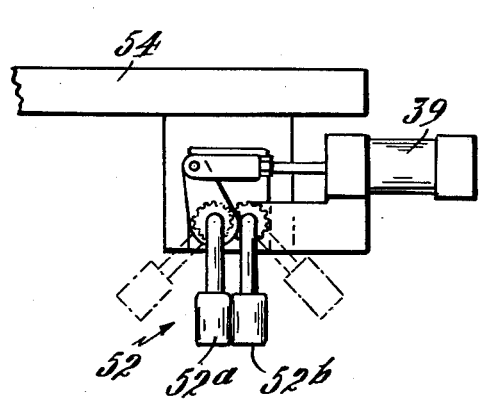

Referring to the drawings (FIGS. 1 and 2), the machine has a rigid base 10 which supports transversely spaced, perpendicularly disposed uprights 12—12 and a horizontally disposed folding table 14. Folding instrumentalities for folding a sheet widthwise, together with drive means therefor, are supported between the uprights 12—12 and folding instrumentalities for thereafter folding the sheet lengthwise, together with driving means therefor, are supported by the folding table 14. The lower ends of the uprights 12—12 are secured to the flat plates 16—16 mounted on the base 10 and one of the plates 16 is adjustable on the base so that the distance between the uprights 12—12 and hence the folding instrumentalities supported therebetween may be adjusted for sheets of different length. Adjustment of the one plate 16, shown at the right side of FIG. 1, is effected by means of a rack 17 mounted on the underside of the plate and a pinion 18 mounted on the base. The folding table 14 is adapted to be correspondingly adjusted in length and, to this end, has slidably interengageable, horizontally disposed, spaced parallel bars 26a, 26b (FIGS. 3 and 4), which alternate, one with another, collectively to form a flat horizontal supporting surface. The bars 26b are fixed to the upper end of a support 22, the lower end of which is fixed to the adjustable plate 16. The bars 26a are fixed to a support 24 which, as will appear hereinafter, provide support for the first transfer means. Lengthening of the folding table is effected by adjusting the plate 16 so as to withdraw the bars from each other and shortening by adjusting the plate 16 so as to increase the interengagement of the bars with each other. In order to provide a smoother surface than is afforded by the metal surfaces of the bars, a vinyl covered panel 27 (FIG. 28a) may be placed lengthwise of the table and secured thereto in suitable fashion. Several such panels may be made up to provide for folding plaits of different length.

Supporting members 28—28 and 29—29 secured to the uprights 12—12 and extending inwardly therefrom at each side, support three pairs of sprockets 30—30, 32—32 and 34—34. The pair of sprockets 30—30 are supported above the folding table 14 at about waist height close to the center of the table, the pair of sprockets 32—32 are mounted near the upper ends of the uprights and adjacent thereto, and the pair of sprockets 34—34 are mounted substantially vertically below the sprockets 32—32 near the base. A pair of endless chains 36—36 are entrained about the sprockets and in the preferred structure the sprocket shafts are inclined rearwardly so that the chains 36—36 travel in a plane which inclines rearwardly from bottom to top. Such inclination of the chains may, of course, be obtained by other expedients, for example by inclining the uprights 12—12 rather than the sprocket shafts. Supporting panels 38 and 40 of smooth rigid transparent material, such as Plexiglas are fastened by means of frame members 31 to the uprights 12—12 within the runs of the chains and between the chains forwardly of the plane of the chains in spaced parallel relation thereto.

Figure 5:
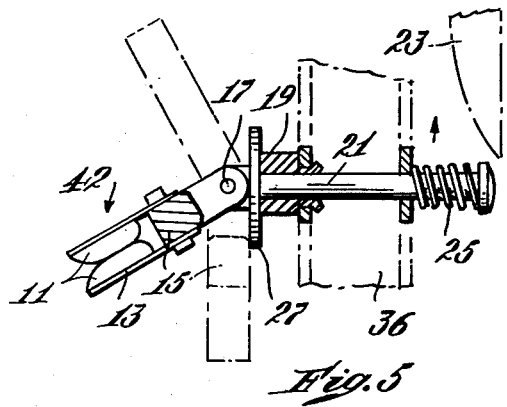

A clamp 42 (FIGS. 1 and 5) is fastened to each of the chains so as to extend forwardly therefrom beyond the plane of the Plexiglas supports. The clamps 42 are movable circuitously thereby from a first position adjacent the sprockets 30—30 to a second position adjacent the sprockets 32—32, to a third position adjacent the sprockets 34—34 and from thence back to the first position. The clamps 42 are adapted frictionally to receive and grip the opposite corners of a sheet and, at the first position, are close enough together so that they are within easy reach of an operator standing at the front of the machine, thus to enable him to insert each corner into a clamp without moving from one position to another. Each chain is driven independently of the other by a pulley 44 connected to the sprocket shaft of the sprocket 32. The pulleys 44 are driven by way of belts 46 and motors 48.

Each clamp has a pair of opposed pads 11 fixed to resilient spring fingers 13 which hold them engaged. Preferably one of the pads is a chromium plated aluminum block and the other a nylon block. The fingers 13 are fixed to a block 15 and the latter is pivotally supported by a pin 17 on a yoke 19. The yoke 19 is, in turn, rotatably mounted on the chain 36. The clamps normally hang down substantially parallel to the plane of the chains, as shown in dotted lines, and are free to pivot about the axis of rotation of the yoke 19. As the clamps are moved into the first position, just above the folding table, it is desirable to have them elevated so as to stand outwardly from the supporting panels 38 and 40 to facilitate engagement of the corners of the sheet without the attendant having to manually lift each clamp individually. To this end there is a cam element 23 mounted at the rear side of each chain adjacent the first position with which the rear end of each spindle 21, mounted on the chain, is engageable to force the pin forwardly against a spring 25. Each spindle has a plate 27 fixed to it operable, by engagement with the block 15, to swing the latter upwardly to a nearly horizontal position and to hold the clamp in this position firmly enough so that the sheet can be thrust between the pads.

Movement of the clamps 42—42 upwardly and away from each other as the chain travels upwardly over the sprockets 32—32 lifts and spreads the sheet so as to hold it suspended above the table resting against the inclined Plexiglas panels 38 and 40 at a slight rearward angle (FIG. 25). As shown in FIG. 1, when fully suspended the clamps 42—42 have passed over the upper sprockets 32—32 and are situated just below them on their outer sides, supporting the sheet fully stretched out lengthwise, with its side edges horizontal, and its end edges inclined at an angle corresponding to the inclination of the Plexiglas panels 38 and 40. In this position the sheet can be readily inspected for flaws and, if defective, can optionally be pulled free of the clamps 42—42 and discarded, or folded, as will appear hereinafter, and set aside for sale as a "second." If the sheet is perfect, folding is now initiated.

To effect folding, first folding means 50—50 (FIGS. 1 and 6) are mounted on the uprights 12—12 adjacent the outer inclined edges of the Plexiglas panels 38—38. Each folding means 50 has a pair of normally open jaws 50a, 50b and is supported at the forward end of a rod 29b for movement inwardly, relative to the edges of the Plexiglas panels so that one jaw is thrust in front of and the other behind the sheet resting against the support. Each rod 29b is slidable in bearings 31b set into one of the uprights 12. There is means for closing the jaws 50a, 50b on the end edges of the sheet and means for retracting the first folding means 50 a predetermined distance with the jaws closed on the end edges so as to tension the sheet between them thereby to form a first fold line. Movement of the folding means into position to grip the end edges, closing of the jaws on the end edges, and retraction of the folding means to tension the sheet are effected by air-operated cylinders 33 and 35 respectively, and/or equivalent electrical means. A flanged sleeve 31a, fixed to the spindle and held against a rod 35a protruding from the cylinder 35 by a spring 29a, provides for controlling movement of the rod 29b. There may be one or more first pairs of folding means for reasons which will appear hereinafter.

Figure 8:
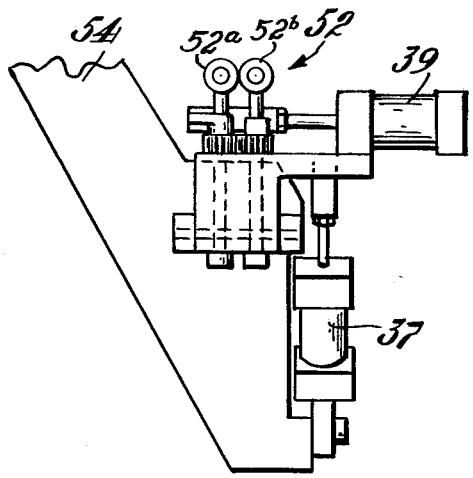
Figure 9:
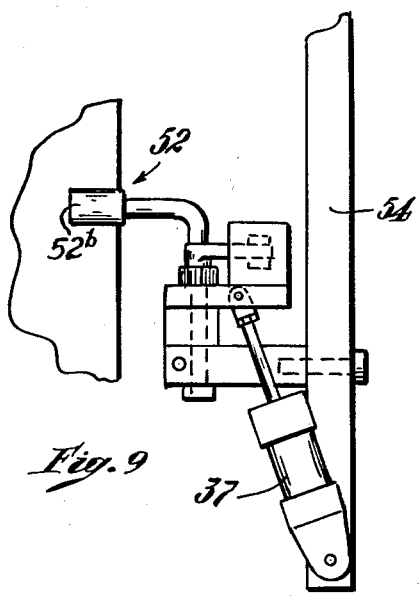

After the first folding means 50—50 have engaged and tensioned the sheet, the chains move the clamps 42—42 downwardly behind the first folding means (FIG. 26) so as to carry that portion of the sheet above the folding means downwardly behind that portion of the sheet below the folding means toward the sprockets 34—34, where they are pulled free of the corners of the sheet since the latter is held against further movement by the folding means and are returned to their first position. The rearward inclination of the Plexiglas supporting panels 38 and 40 induces the portion of the sheet above the first folding means 50—50, as shown in FIGS. 25 and 26, to gravitate rearwardly thereof as the clamps 42—42 move downwardly and so to travel downwardly behind the first folding means and the portion of the sheet below the first folding means. At this point in the operation of the apparatus the sheet is folded once on a fold line extending lengthwise thereof between the first folding means 50—50 (FIGS. 11 and 12). Assuming that the fold is half-way between the side edges, the sheet is now suspended with a fold along its upper horizontal edge. A second pair of folding means 52—52 (FIGS. 1, 7, 8 and 9) having jaws 52a, 52b and provided with air-operated means for closing them, are supported adjacent the edges of the Plexiglas panels 38—38 midway between the folding means 50—50 and the lower horizontal edges of the folded sheet on pivotally supported arms 54—54, the latter being mounted on brackets 56—56 bolted to the uprights 12—12 to swing forwardly and upwardly about pivots 58—58. Movement of the arms 54—54 is effected by linkages 60—60 driven by motors 62—62 at the base of the machine. The second folding means 52—52, carried by the arms 54—54, move along curved paths, as shown by the dot and dash lines a—a (FIG. 2), to move the folded sheet forwardly and upwardly with reference to the first folding means 50—50, so as to fold the sheet a second time. As the sheet is moved upwardly by the arms 54—54, the first folding means 50—50 releases the sheet and are retracted. The second folding means 52 (FIGS. 7, 8 and 9) are advanced and retracted relative to the edge of the sheet by an air-operated cylinder 37 and its jaws 52a and 52b, which are normally held open, are opened and closed by an air-operated cylinder 39.

Figure 10:
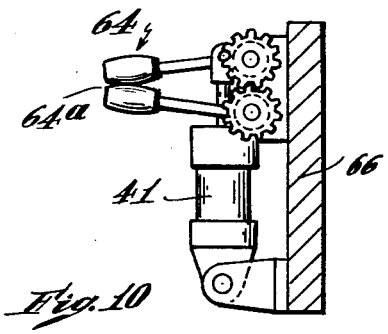
Figure 32:
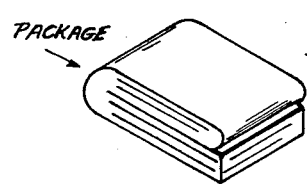
FIG. 32 is a perspective view of a completely folded sheet.

In the elevated position the sheet hangs suspended between the second folding means 52—52 (FIGS. 13 and 18) and, in this position, first transfer means 64—64 (FIGS. 2 and 10), each comprised of two or more pairs of gripper jaws 64a are brought into engagement with the upper half of the double-folded sheet at its ends, whereupon the second folding means 52—52 release the sheet. The first transfer means 64—64 are supported at the ends of arms 66—66 adjacent the end edges of the sheet, inwardly with respect to the arms 54—54. The jaws 64a are normally held wide open as the sheet is elevated by the second folding means 52—52 and are brought into engagement with the end edges of the sheet by air-operated means 41. The arms 66—66 are mounted for compound movement forwardly from their upright position (FIG. 2), downwardly toward the folding table and then rearwardly with respect to the top of the table and, to this end, are supported on pivots 68—68 at the upper ends of pivotally supported arms 70—70. The arms 70—70 are supported by pivots 71—71 which are inclined downwardly and outwardly so that the pivots 68—68 in turn are inclined downwardly and backwardly at their inner ends. The lower ends of the arms 70—70 are connected to linkages 72—72 and the rear ends of the arms 66—66 are connected by linkages 74—74 to suitable driving mechanism for effecting movement of the transfer-supporting ends of the arms 66—66 along arcuate paths, as indicated by the dot and dash lines b—b. The compound movement effected by the driving linkages, moves the upper half of the sheet gripped between the jaws 64a of the first transfer means 64, forwardly and downwardly to a position parallel to the upper surface of the table and forwardly thereof (FIGS. 15 and 20), in which position the lower half of the sheet hangs suspended downwardly, substantially perpendicular to the upper surface of the table at the forward side thereof. Rearward movement of the arms 66—66 parallel to the top of the table now draws the downwardly hanging lower half of the sheet against the forward edge of the table and over the edge onto its upper surface, folding it beneath the upper half held parallel to the table by the jaws, thus folding the sheet a third time. The jaws now release the ends of the sheet so that it lies folded in the form of an elongate plait lengthwise of the table. The plait, as thus folded widthwise contains eight superposed folds of substantially equal width. The inclination of the pivots 68—68 cock the arms 66—66 so that during their forward and downward movement their forward ends move away from each other thereby stretching the sheet lengthwise as the final fold is consummated at the top of the table.

For endwise folding of the plait resting on the folding table 14, second transfer means 76 are provided for movement lengthwise of the table to fold the plait on itself twice. The transfer means 76 (FIGS. 1, 3 and 27 to 30) comprises four pairs of jaws 77, mounted on an arm 78 pivotally supported at 80 for rocking movement about a horizontal axis on a carriage 82, the latter being mounted at the underside of the table (FIG. 4) for movement lengthwise thereof on a track 83. The track 83 is secured to the support 24, the latter comprising a beam 87 fixed to the base in a horizontal position by a plurality of legs 89. There is means for effecting movement of the carriage to bring the jaws 77 of the transfer means 76 into engagement with the end of the plait resting on the table and, while continuing to move the carriage lengthwise of the table, rocking the arm 78 upwardly about its pivot so as to lift the end of the sheet from the table and pull it forwardly above the portion resting on the table toward the opposite end. The jaws 77 are closed by an air-operated cylinder 78a.

To facilitate closing of the jaws 77 on the left end of the plait spaced parallel leaf spring elements 26c (FIG. 28a) are secured to alternate ones of the bars making up the table 14 between adjacent jaws 77 so as to support the left-hand end of the plait.

Figure 28A:
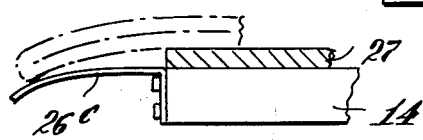

It has also been found desirable to make the top of the table smoother than the surface provided by the metal bars hence, as shown in FIG. 28a, a flat, rigid panel 27 having a vinyl or like smooth surface may be placed across the bars 26a and 26b for supporting the sheet when in plait form. Since there are only a few different lengths of sheet, several panels may be made up and substituted one for another when a sheet of given length is to be folded.

The carriage 82 is supported on the track 83 at its lower edge by pinions 91 which mesh with a rack 93 on the track. One of the pinions 91 is driven by meshing gears 95 and 97, the latter being driven by a motor 99. The upper edge of the carriage is supported by a guide strip and guide rollers 103 and 105 respectively. Pivotal movement of the arm 78 is effected by an air-operable motor 101 supported by the carriage.

In order to make a center fold, a first folding bar 84 (FIGS. 1, 2, 27 and 28) of flexible material is fastened at one end to an arm 86 pivotally mounted on the table support 24 at the forward side for movement from a position below the surface of the table, upwardly and across the plait resting thereon. The folding bar 84 is bent, as illustrated (FIG. 2), so that, when retracted, it lies close to the table so as not to interfere with the operator. Movement of the folding bar to a position across the table flattens it so that, in its operative position, it is substantially parallel to the top of the table. Movement of the folding bar is effected by an air-operated piston 88. The carriage first moves the transfer means 76 from the left-hand end of the folding table all the way to the right thereby folding the portion of the plait at the left side of the first folding bar 84 over onto the portion at the right side of the first folding bar. At the end of the stroke, the jaws 77 of the transfer means release the end of the plait, the carriage 82 is retracted to a position adjacent the first fold, substantially midway between the ends, and the first folding bar 84 is retracted. A second folding bar 90, situated at three-quarters of the distance lengthwise of the table from the left end, is now moved into engagement with the plait on the table, whereupon the carriage is again moved lengthwise of the table, first to engage the jaws 77 of the transfer means with the folded end of the plait at the center, and then to lift the folded end from the table and pull it across the second folding bar to fold the plait again. The plait has now been folded twice lengthwise which completes the folding operation. It is to be observed that since the folding bars are mounted on the movable part of the table and hence are at a constant distance from the right-hand end of the table, the lower half of the fold will have a constant length, to wit, 52½ inches. If the length of the sheet is 108 inches this would be half of the length, however, if a 99 inch sheet is folded, the lower half will be 52½ inches and the upper half 34½ inches, that is, when the right side of the table is adjusted toward the left to shorten the length of the table for a shorter sheet, the transfer means folds over the difference and not necessarily a half of the sheet. The travel of the transfer device is effected by suitable switches embodied in the drive. In this way a constant length package is provided regardless of the length of the sheet.

It may be desirable to omit the second folding bar 90 and to make the second fold by hand, for example, under certain circumstances it was found that the operator could perform the second fold as quickly as could be performed by the machine transfer means and such folding gave the operator an opportunity to improve the first fold appreciably. If skilled operators are available therefor, it is within the contemplation of this invention to remove the second folding means and perform the final fold by hand.

It is evident from the foregoing that the folding means are provided in duplicate and are symmetrically arranged, together with their driving mechanism so as to operate on the opposite ends of the sheet independently of each other and hence to be adjustable relative to each other without interrupting driving connections, or requiring dismantling of any parts for the purpose of effecting adjustment. The electrical and fluid motors employed for powering the various instrumentalities are operated in proper sequence and synchronized by conventional programming means which does not require specific illustration herein for a complete understanding of the construction and operation of the machine. It is possible, by means of the independent control of the instrumentalities, to elevate the first transfer means 64 at the left end of the table independently of that at the right end of the table to move it to an out-of-the-way position so as not to interfere with the movement of the second transfer means 76 on the table.

As described above, the sheet was folded so as to have eight folds widthwise and four folds lengthwise and, to this end, the clamps 42—42 were stopped so that the distance between them and the first folding means 50—50 was equal to half of the width of an 81 inch sheet. If desired, the sheet may be folded so as to have six folds widthwise and four folds lengthwise. For this purpose (FIGS. 16 and 17), additional folding means 500—500 are mounted on the uprights above the folding means 52—52. The clamps 42—42 are programmed to stop so that the distance between them and the folding means 500—500 is equal to half of an 81 inch sheet. The folding means 500—500 are now located two-thirds of the way from the folded edge toward the bottom rather than one-half. As shown in FIGS. 18 and 19, when folded the second time, one-third of the sheet is situated at the front and two-thirds at the back side of the new fold line. The folding means 64—64 then grips the upper half of the sheet, leaving the lower half suspended, moves the sheet downwardly toward the table so that the upper half is substantially parallel thereto and the lower half hanging downwardly in front of the table and then parallel to the table so as to wipe the lower half inwardly beneath the upper half, thus providing a plait of six folds. Endwise folding of the plait to produce four folds is now carried out as before to complete the package.

The folding operations, as described above, were carried out on 81 inch sheets, that is, sheets 81 inches in width. Corresponding folding operations, to provide packages of the same width on sheets of 72 and 63 inches in width, either to make packages with eight folds or six folds, may also be accomplished in the same fashion. Thus, if a 72 inch sheet is to be folded in eight folds, the first fold is made so that that portion of the sheet suspended over the first folding means 50—50 at the back side, corresponds in length to one-half of an 81 inch sheet (FIGS. 21 and 22), to wit, is 40½ inches, and that portion folded over the front side of the folding means is the balance, to wit, 31½ inches. The second folding means 52 grips the folded sheet midway between its upper folded edge and the lower edge of the rear side so as to fold the two plies double in the same fashion as described above, and move it up to the transfer means 64—64, which then transfers it into folding relation to the table so as to fold it a third time. In order to make a six fold package the sheet is folded over the upper folding means 500—500 (FIGS. 23 and 24) so that again 40½ inches are suspended over the rear side of the folding means and 30½ inches over the forward side, whereupon the second folding means 500—500 are brought into engagement with the end edges at two-thirds of the distance from the fold at the upper edge and folding is carried out, as previously described, to effect six folds. Folding of 63 inch sheets can be carried out in the same fashion.

It is thus possible to fold 81 inch and 72 inch sheets in eight fold or six fold packages of the same size. With a slight modification of the machine, 63 inch sheets may also be folded in the same manner.

In the foregoing description the sequence of operations is described as first elevating the sheet to its full length and breadth to permit inspection, folding it widthwise to provide an elongate plait, and finally folding the plait lengthwise to provide a finished package. The folding time can be shortened however by programming the sequence of operation so that endwise folding of a plait is commenced just after the next sheet has been moved up to its suspended position for inspection and completed during the ensuing widthwise folding rather than folding immediately upon deposit of the plait on the table.

It should be understood that the present disclosure is for the purpose of illustration only and that this invention includes all modifications and equivalents which fall within the scope of the appended claims.

We claim:

1. Apparatus for folding sheets comprising a folding table, first folding means supported above the table in spaced relation, clamps situated above the first folding means for supporting a sheet, by two of its corners at one side edge in suspension, with said side edge at a predetermined distance above the first folding means and with its end edges adjacent the first folding means, said first folding means being movable into engagement with the end edges of the sheet to grip and support the sheet intermediate its side edges, and said clamps being movable thereafter downwardly relative to the first folding means to fold the portion of the sheet above the first folding means downwardly on the first folding means behind the portion of the sheet below the first folding means to form a first fold and to disengage the clamps from the corners of the sheet, second folding means situated a predetermined distance below the first folding means adjacent the end edges of the sheet, movable into engagement with the end edges of the sheet intermediate the folded edge and the side edges to grip and support the sheet and thereafter movable forwardly and upwardly relative to the first folding means to elevate the sheet to a position above the first folding means to make a second fold, said first folding means being operable to release the sheet during elevation of the second folding means, transfer means situated at said elevated position of said second folding means operable to grip the upper half of the doubly folded sheet, said second folding means being operable to release the doubly folded sheet to said transfer means following engagement of the transfer means with the upper half of the sheet, said transfer means thereafter being movable forwardly and downwardly toward the table to a position in which the upper half of the sheet is situated forwardly of the table top and substantially parallel thereto, and the lower half of the sheet hangs downwardly from the rear edge of the upper half in front of the table and then rearwardly, substantially parallel to the top of the table beneath the upper half to form an elongate plait.

2. Apparatus according to claim 1, comprising end folding means associated with the folding table operable, a first time, to grip the end of the plait resting on the table and transfer it lengthwise thereof to the other end of the table to double it once and then again to grip the folded end of the plait and transfer it lengthwise of the table to double the folded plait.

3. Apparatus according to claim 1, provided with end folding means comprising transfer means and first and second folding bars situated at midway and three-quarter way from one end of the table, said transfer means including jaws operable, a first time, to grip the end of the plait, raise it from the table and carry it across the first folding bar to fold it once, and a second time to grip the folded end of the plait, raise it from the table and carry it across the second folding bar, said first and second folding bars being movable into and out of operative position in timed relation with the movement of the transfer means so that when the first folding bar is in operative position the second is retracted and vice versa.

4. Apparatus for folding sheets comprising a folding table having a flat, horizontally disposed top, flat supporting panels at the rear side of the table sloping upwardly and rearwardly therefrom, first folding means supported above the table adjacent the opposite edges of the supporting panels, clamps for holding a sheet in suspension, by two of its corners at one side edge resting outspread and full length against the forward inclined surfaces of the supporting panels, with one side at a predetermined distance above the first folding means and its end edges adjacent the first folding means, said first folding means being movable into engagement with the end edges of the sheet to grip and support the sheet intermediate its side edges and said clamps being movable thereafter downwardly relative to the first folding means to fold the portion of the sheet above the first folding means downwardly on the first folding means behind the portion of the sheet below the first folding means to form a first fold, and to disengage the clamps from the corners of the sheet, second folding means situated at a predetermined distance below the first folding means adjacent the opposite edges of the supporting panels movable into engagement with the end edges of the sheet intermediate the first fold and the side edges therebelow to grip and support the sheet for movement forwardly and upwardly relative to the first folding means to elevate and fold the sheet a second time, said first folding means being operable to release the sheet during elevation, and transfer means situated at said elevated position of said second folding means operable to grip the upper half of the doubly folded sheet, said second folding means being operable to release the doubly folded sheet to said transfer means following engagement of the transfer means with the opposite ends of the sheet, said transfer means thereafter being movable forwardly and downwardly toward the table to a position in which the upper half of the sheet is situated forwardly of the top of the table and substantially parallel thereto, and the lower half of the sheet hangs downwardly from the rear edge of the upper half in front of the table and then rearwardly, substantially parallel to the top of the table, to draw the lower half of the sheet onto the top of the table beneath the upper half.

5. Apparatus for folding sheets comprising a base, a folding table mounted on the base having a horizontally disposed flat top, a pair of uprights secured to the base adjacent the opposite ends of the table, flat supporting panels supported between the uprights in a plane inclined upwardly and rearwardly relative to the top of the table, the distance between the outer edges of the supporting panels being approximately equal to the length of a sheet to be folded, first folding means mounted on the uprights adjacent the outer edges of the supporting panels, a pair of endless chains mounted on sprockets on the uprights behind the supporting panels so that one run of each chain is parallel to an outer edge of the supporting panel with which it is associated, clamps fixed to the chains, said clamps being adapted frictionally to grip the corners of a sheet at opposite ends of a side and movable by the chains to raise the sheet upwardly over the forward surface of the supporting panels to a position in which the upper side edge is at a predetermined distance above the first folding means, and its end edges adjacent the first folding means, said first folding means being movable into engagement with the end edges of the sheet to grip and support the sheet intermediate its side edges, and said clamps being movable thereafter downwardly relative to the first folding means to fold the portion of the sheet above the first folding means downwardly on the first folding means behind the portion of the sheet below the first folding means to form a first fold lengthwise of the sheet and to disengage the clamps from the corners of the sheet, second folding means situated at a predetermined distance below the first folding means adjacent the opposite edges of the supporting panels movable into engagement with the end edges of the sheet intermediate the first fold and the side edges therebelow to grip and support the sheet for movement forwardly and upwardly relative to the first folding means to form a second fold, said first folding means being operable to release the sheet during elevation and transfer means situated at said elevated position of said second folding means operable to grip the upper half of the doubly folded sheet, said second folding means being operable to release the doubly folded sheet to said transfer means following engagement of the transfer means with the opposite end edges of the sheet and said transfer means thereafter being movable forwardly and downwardly toward the table to a position in which the upper half of the sheet is situated forwardly of the top of the table and substantially parallel thereto, and the lower half of the sheet hangs downwardly from the rear edge of the upper half in front of the table and then rearwardly, substantially parallel to the top of the table, to draw the lower half of the sheet onto the top of the table beneath the upper half.

6. Apparatus for folding sheets comprising a rigid base, an elongate folding table mounted on the base having a horizontally disposed, flat top, a pair of spaced parallel uprights mounted on the base at the rear side of the table adjacent its ends, flat panels of transparent material mounted between the uprights at the rear side of the table in a plane inclined upwardly and rearwardly relative to the top of the table providing an inclined flat supporting surface widthwise of the apparatus corresponding substantially in width to the length of the sheet to be folded, the outer edges of which are substantially parallel to each other and the inner edges of which diverge upwardly away from each other, a pair of chains mounted on the uprights behind the supporting panels, each of which has a run parallel to a diverging edge and a run parallel to an outer edge of the supporting panel with which it is associated, clamps supported by the chains for movement from a first position near the top of the table upwardly and outwardly along the diverging edges of the supporting panels to lift and spread a sheet engaged with the clamps over the front surface of the supporting panels to a position in which the upper side edge is at a predetermined distance above the first folding means and the end edges parallel to the outer edges of the supporting panels, said first folding means being movable into engagement with the edges of the sheet to grip and support the sheet intermediate its side edges and said clamps being movable downwardly relative to the first folding means to fold the portion of the sheet above the first folding means downwardly on the first folding means behind the portion of the sheet below the first folding means to form a first fold and to disengage the clamps from the corners of the sheet, second folding means situated at a predetermined distance below the first folding means adjacent the outer edges of the supporting panels movable into engagement with the end edges of the sheet to grip and support the sheet intermediate the first folds and the side edges therebelow and support the sheet for movement forwardly and upwardly relative to the first folding means to fold the sheet a second time, said first folding means being operable to release the sheet during such elevation, and transfer means situated at said elevated position of said second folding means operable to grip the upper half of the doubly folded sheet to support it for movement forwardly and downwardly, said second folding means being operable to release the sheet to the transfer means following engagement of the transfer means with the end edges of the twice folded sheet, said transfer means being operable to move the upper half of the sheet to a position forwardly of the top of the table and substantially parallel thereto in which the lower half of the sheet hangs downwardly from the rear edge in front of the table and then rearwardly, substantially parallel to the top of the table, to draw the lower half of the sheet onto the top of the table beneath the upper half.

7. Apparatus according to claim 4, wherein the clamps at their upper position are spaced from the first folding means by an amount equal to half of the width of the sheet.

8. Apparatus according to claim 4, wherein the clamps are spaced from the first folding means by an amount corresponding to one-half the width of an 81 inch sheet.

9. Apparatus according to claim 4, wherein there are alternate first and second folding means spaced lengthwise of the outer edges of the supporting panels and the clamps at their upper position are spaced from each of the folding means by an amount corresponding to one-half of the width of the sheet which is to be folded thereon.

10. Apparatus according to claim 4, wherein the first and second folding means are spaced from each other a distance corresponding to a quarter of the width of the sheet.

11. Apparatus according to claim 4, wherein the first and second folding means are spaced at a distance corresponding to a quarter of the width of an 81 inch sheet.

12. Apparatus according to claim 4, wherein the first and second folding means are spaced at a distance corresponding to one-third of the width of the sheet.

13. Apparatus according to claim 4, wherein the first and second folding means are spaced a distance corresponding to one-third of the width of an 81 inch sheet.

14. Apparatus according to claim 4, wherein the second folding means will have engagement with both the front and rear plies of a 71 inch sheet supported by the first folding means so that the rear one of the plies equals half the width of an 81 inch sheet.

15. Apparatus according to claim 4, wherein the second folding means will have engagement with both the front and rear plies of a 63 inch sheet supported by the first folding means so that the rear one of the plies equals half the width of an 81 inch sheet.

16. Apparatus according to claim 1, wherein there are means supporting the clamps for movement from a first position near the top of the table substantially at the center thereof closely adjacent each other for convenience in engaging the corners of the sheet therewith, upwardly and away from each other to a second position for holding the sheet outspread in suspension to permit inspection preparatory to folding, then downwardly from said second position to a third position to fold the sheet over the first folding means and to effect disengagement from the corners and then toward each other to said first position preparatory to the next operation.

17. Apparatus according to claim 1, wherein each clamp is supported by an endless chain entrained on sprockets for movement from a first position in which a first pair of sprockets support portions of the chains closely adjacent each other at substantially waist height above the table so that the clamps are close enough to each other to be easily engaged with the corners of the sheet upwardly to a second position in which a second pair of sprockets support portions of the chains high enough and far enough apart so that the clamps hold the sheet suspended full length and outspread, then downwardly parallel to the end edges of the sheet to a third position in which a third pair of sprockets support portions of the chain below the first folding means far enough to effect disengagement of the clamps from the corners of the sheet while they are moving parallel to the end edges thereof and from thence back to the first pair of sprockets.

18. Apparatus according to claim 17, wherein the clamps are supported on the chains for pivotal movement, said clamps normally hanging substantially parallel to the plane of the chains and cam means adjacent the first position for holding the clamps distended forwardly of the plane of the chains.

19. Apparatus according to claim 17, wherein each clamp has opposed spring-pressed pads and is supported on its chain for pivotal movement on a spindle so as to project forwardly from the plane of the chain, said clamp normally hanging downwardly substantially parallel to the plane of the chains and a cam at the rear side of each chain adjacent the first position of the clamp operable, by engagement of the spindle therewith as the clamp is moved to said first position, to move the clamp to a position projecting forwardly of said plane.

20. Apparatus according to claim 1, wherein the clamps are supported for movement in a plane inclined rearwardly from bottom to top which passes through a line extending between the first folding means.

21. Apparatus according to claim 1, wherein the clamps are supported for movement in a plane inclined rearwardly from bottom to top which includes the lines between the first and second folding means.

22. Apparatus according to claim 1, wherein the clamps are supported for movement in a plane inclined rearwardly from bottom to top which passes through the line between the first folding means and there are inclined supports in said plane supporting the sheet with its side edges correspondingly inclined.

23. Apparatus according to claim 1, wherein the clamps are supported for movement in a plane inclined rearwardly from bottom to top which passes through a line between the first folding means, and there are flat transparent supports inclined in said plane for supporting the suspended portion of the sheet inclined rearwardly from bottom to top at a corresponding angle.

24. Apparatus according to claim 1, wherein the clamps are supported for movement in a plane inclined rearwardly from bottom to top which coincides with a plane passing through the lines extending between the first and second folding means, and there are flat transparent supports inclined in said plane for supporting the suspended portion of the sheet in a corresponding plane.

25. Apparatus according to claim 1, wherein the first folding means are movable toward each other to engage the end edges of the sheet and away from each other to tension the sheet widthwise.

26. Apparatus according to claim 1, wherein the first folding means comprises normally open jaws movable toward each other to bring the jaws into engagement with the end edges of the sheet and to grip and pull the end edges away from each other to tension the sheet widthwise.

27. Apparatus according to claim 1, wherein the second folding means comprises normally open jaws movable toward each other to bring the jaws into engagement with the end edges of the sheet and to grip and pull the end edges away from each other to tension the sheet widthwise.

28. Apparatus according to claim 1, wherein the second folding means comprises normally open jaws supported adjacent the end edges of the sheet adapted to be closed on the end edges to grip the same and pivotally mounted arms on the distal ends of which the jaws are mounted, said arms being movable forwardly and upwardly about a horizontal axes situated above the first folding means.

29. Apparatus according to claim 1, wherein the second folding means comprises normally open jaws, a pair of arms supporting the jaws adjacent the end edges of the sheet for closing on the end edges of the sheet, said arms normally supporting the jaws substantially in alignment with the end edges of the sheet, and means pivotally supporting the arms for pivotal movement about an axes situated above and behind the first folding means for movement of the jaws forwardly and upwardly about the first folding means.

30. Apparatus according to claim 1, wherein the transfer means comprises normally open jaws adapted to be closed on the upper half of the sheet and pivotally mounted arms supporting said jaws for movement forwardly and downwardly.

31. Apparatus according to claim 1, wherein the transfer means comprises normally open jaws adapted to be closed on the upper half of the sheet to hold it flat, leaving the lower half freely suspended and arms supported for compound movement operable to swing the jaws forwardly and downwardly to a horizontal plane at the front side of the table and then rearwardly parallel to the table.

32. Apparatus for folding sheets comprising a folding table adapted to support a sheet folded parallel to two of its edges to form an elongate plait of predetermined width corresponding in length to the edges, a first fold bar movable into a position across the table into engagement with the plait resting thereon, a tranfer device at one end of the table movable lengthwise thereof to carry the end of the plait across the first fold bar to fold the plait once, to release the end and to return to a position adjacent the fold, and a second fold bar movable into a position across the table into engagement with the folded plait resting thereon, said transfer device being movable lengthwise of the table a second time to carry the folded end of the plait across the second fold bar to fold the plait a second time to form a package, release the end and return to its initial position, said second fold bar being held retracted during the first movement of the transfer device lengthwise of the table, and said first fold bar being held retracted during the second movement of the transfer device lengthwise of the table.

33. Apparatus for folding sheets comprising a folding table adapted to support a sheet folded parallel to two of its edges to make a flat elongate plait of predetermined width corresponding in length to the edges, first and second fold bars situated midway between the ends of the table and three-quarters of the way from one end thereof respectively, said first fold bar being movable from a retracted position near the forward edge of the table across the table into engagement with the plait resting thereon, a transfer device situated at said one end of the table, and a carriage supporting the transfer device for movement lengthwise of the table and pivotal movement about a horizontal axis relative to the table for effecting an initial movement of the transfer device into engagement with the end of the plait and further movement to lift the end of the plait from the table and transfer it across the first fold bar to the opposite end of the table to fold the plait once, release the end and to return to a position adjacent the folded end, said first fold bar being retractable simultaneously with retraction of the transfer means, said second fold bar being movable across the table into engagement with the folded plait following retraction of the first fold bar, and said carriage being movable lengthwise of the table a second time initially to engage the transfer device with the folded end of the plait, lift the folded end of the plait and transfer it over the second fold bar to fold the plait once again to form a package, release the end and return it to its initial position whereupon said second fold bar is retracted.

34. Apparatus according to claim 1, wherein the forward ends of the first transfer means are movable away away from each other as they move forwardly and downwardly so as to stress the sheet lengthwise as it is moved into engagement with the table, to consummate the final fold widthwise.

35. Apparatus according to claim 1, wherein the first transfer means are supported at their rear ends on axes inclined downwardly and rearwardly toward each other so that their forward ends move away from each other during their forward and downward movement to stretch the sheet lengthwise.

36. Apparatus according to claim 1, wherein the first transfer means comprises spaced angle arms, first means pivotally supporting each of said angles near an end of one limb rearwardly of the plane of the supporting panels with the elbow projecting forwardly from the plane of the panels and the other limb projecting upwardly, means pivotally supporting said first means rearwardly of the plane of the panels below the pivotally supported limb, and means connected to the limb rearwardly of its pivot and to said first means operable to effect compound swinging movement of the angle downwardly, first outwardly and then inwardly relative to the table.

37. Apparatus according to claim 36, wherein said first pivot means is inclined upwardly and backwardly and said second pivot means is inclined downwardly and outwardly.

38. Apparatus according to claim 1, comprising end folding means associated with the folding table operable to grip an end of the plait resting on the table and transfer it lengthwise of the table to fold the plait once.

39. Apparatus for folding sheets comprising a folding table adapted to support a sheet folded parallel to two of its edges to form an elongate plait of predetermined width corresponding in length to the edges, a folding bar movable into a position across the table above the plait into engagement therewith at a predetermined distance from the right end of the table and a transfer device at the left end of the table operable to grip the plait at the left end and to move lengthwise of the table to carry the left end of the plait across the folding bar to fold the plait once.

40. Apparatus according to claim 38, wherein the transfer device comprises a plurality of spaced jaws operable to close on the end of the plait as the transfer device commences to move lengthwise of the table and to release the end of the plait when it reaches the right end of the table.

41. Apparatus according to claim 40, wherein a plurality of flat resilient fingers are fixed to the left end of the table intermediate the spaces between the jaws on the transfer device for supporting the left end of the plait in a position to facilitate engagement of the jaws with the plait.

42. Apparatus according to claim 1, wherein a flat rigid panel is disposed on the table lengthwise thereof providing a smooth uninterrupted slick surface.

43. Apparatus according to claim 1, wherein a rigid panel, provided with a vinyl surface, is disposed on the table, for supporting the folded plait preparatory to end folding, References Cited in the file of this patent
UNITED STATES PATENTS

| | | |
|---|---|---|
| 30,029 | Underhill | Sept. 11, 1860 |
| 460,237 | Brewtnall | Sept. 29, 1891 |
| 2,680,612 | Hubelmeyer | June 8, 1954 |